United States Patent [19]

Sherrod

[11] Patent Number: 4,642,756
[45] Date of Patent: Feb. 10, 1987

[54] METHOD AND APPARATUS FOR SCHEDULING THE EXECUTION OF MULTIPLE PROCESSING TASKS IN A COMPUTER SYSTEM

[75] Inventor: Phillip H. Sherrod, Nashville, Tenn.

[73] Assignee: S & H Computer Systems, Inc., Nashville, Tenn.

[21] Appl. No.: 712,137

[22] Filed: Mar. 15, 1985

[51] Int. Cl.[4] .............................................. G06F 9/40
[52] U.S. Cl. .................................... 364/200; 364/300
[58] Field of Search ... 364/200 MS File, 900 MS File, 364/300

[56] References Cited

U.S. PATENT DOCUMENTS 4,145,735  3/1979  Soga .................................... 364/200
4,351,025  9/1982  Hall, Jr. .............................. 364/200

Primary Examiner—Raulfe B. Zache
Attorney, Agent, or Firm—Banner, Birch, McKie & Beckett

[57] ABSTRACT

A task schedular for scheduling the execution of a plurality of tasks within a computer system. The task scheduler utilizes a combination of externally assigned priorities and internally calculated priorities to optimize the responsiveness of the computer to external interactions.

4 Claims, 4 Drawing Figures

METHOD AND APPARATUS FOR SCHEDULING THE EXECUTION OF MULTIPLE PROCESSING TASKS IN A COMPUTER SYSTEM

BACKGROUND OF THE INVENTION

The present invention relates generally to the field of electronic computer systems, and more particularly, is directed to a method and apparatus for scheduling the execution of a plurality of processing tasks within a computer system.

A conventional computer system, such as shown in FIG. 1, comprises a number of interrelated elements including RAM memory 1 and ROM memory 2 where instructions and temporary data storage areas of a computer program reside, mass storage and Input/Output (I/O) peripherals 3 which allow the computer to access mass storage devices, such as magnetic disk and tape units, and to communicate with the outside world through such devices as printers, user interactive terminal display 4 which allows the computer to communicate with the user and a central processing unit (CPU) 5 which supervises the flow of information between the various elements of the system and which performs logic calculations and other functions based on instructions in the computer program and data associated with the program.

Present day large-scale computer systems are quite sophisticated in operation and are often very expensive to manufacture and operate. In order to provide more access to such systems at a reasonable cost, the concept of "time sharing" was developed. In a time sharing computer system, a number of programs reside in the computer at the same time and seemingly run simultaneously. Each program is referred to as a task or job and though it may appear to the casual user that the computer is continuously devoting its full attention to the task being performed for the user, in actuality, each task receives only a fraction of the computer's time before the computer moves on to other tasks in "round-robin" fashion. Typically, each computer user is connected to a separate task. In addition, there may be other tasks which perform internal functions for the computer system or which yield results which will eventually go to a person who is not currently using the computer.

In conventional computer systems, a facility known as an "interrupt" allows the execution of the CPU to be interrupted periodically based on requests for service from internal or external devices or based on the passage of a certain amount of time. When an interrupt occurs, the CPU stores information about the task it was performing when the interrupt occurred and then executes another task determined by the nature of the interrupt. The stored information allows the CPU to resume execution of the task which was interrupted once it has finished performing the task required by the interrupt. The CPU may also execute other tasks required by other interrupts before returning to the original task.

A time sharing computer system, whether it be driven by interrupts or by some other scheme, must have means for selecting the task which will be executed by the CPU and deciding how long the CPU will execute the task before reassigning the CPU to another task. Such means can be referred to as a task scheduler. The operation of the task scheduler is itself supervised by the CPU. The CPU time spent in supervising the operation of the task scheduler is overhead and should be minimized.

Tasks within a time sharing computer system can be divided into the following three categories based on the criticality of the timeliness of the computer response to external events related to the task.

(1) "Real-time" tasks where the essence of the computer function is to provide a rapid response to external events. An example of this type of task is the guidance control program for a missile. If the computer is unable to provide rapid responses to course deviations or changing fuel weight, the missile will go off course.

(2) "Interactive" tasks where a delay in response is inconvenient and inefficient but is not disastrous. An example of this type of task is a program which provides information about a customer's account status to a bank teller. If the computer is unable to provide a rapid response, the teller's time will be wasted and a waiting customer will be annoyed, but the bank will not become insolvent.

(3) "Background" tasks where response time to external events is not important. An example of this type of task is a program to print bank account summary statements at the end of the month.

Interactive tasks may be subdivided into two additional categories. It is generally accepted that it is desirable to give precedence to short interactive inquiries over requests for service which will take an extended period of time. For example, two bank managers may both issue "interactive" requests to the bank's computer. One request is to display the current balance for an account, the other is to sort all accounts alphabetically and produce a complex report. Usually, it is desirable to give precedence to the short interactive request rather than to delay it while computing the complex report.

Various task schedulers have been proposed and implemented which are somewhat adequate for servicing real-time or background type tasks. One approach in wide use is to assign fixed priorities to each task and base the scheduling of tasks solely on these priorities. While this approach may be suited for dedicated real-time applications, it is unacceptable for interactive applications where the nature of the interactive request is more important than a previously specified priority. Another approach is to use a fixed "time-slice" to direct the CPU to one task after another in a round-robin fashion. This approach has the effect of giving all tasks equal priority. Neither of these scheduling methods is adequate for a computer system which supports real-time, interactive, and background tasks.

The ideal task scheduler should recognize the nature of each task and allocate the CPU in such a fashion as to provide optimum responsiveness to the tasks based on how important rapid response is to each task. This level of sophistication in task schedulers known in the prior art has not been achieved heretofore. The problem in achieving such a level of sophistication is compounded by the fact that the classification of each task (i.e., real-time, interactive, or background) cannot be determined by the task scheduler without information being provided by the computer operator and because the nature of each task may change dynamically over time. Applicant has discovered a novel solution to this problem and accordingly has developed a task scheduler which is far superior to those known in the art.

SUMMARY OF THE INVENTION

Therefore, it is the overall object of the present invention to provide a method and apparatus for scheduling the execution of multiple tasks in a computer system which is superior to those presently known in the art.

It is a specific object of the present invention to provide a task scheduler for a multi-tasking computer system which assigns some tasks fixed scheduling priorities designated by the computer operator and which assigns other tasks scheduling priorities based on internally computed priorities.

It is a further specific object of the present invention to provide a method for assigning internal scheduling priorities to tasks which optimizes responsiveness of the computer to brief computational requests without requiring external specification of which tasks are performing said requests.

It is a still further specific object of the present invention to provide a task scheduling method and apparatus which adapts to changing task load without operator intervention.

It is another specific object of the present invention to provide a method and apparatus for scheduling tasks in a multi-tasking computer system which optimizes the utilization of peripheral devices by adjusting internal task priorities based on the utilization of said peripheral devices.

These and other objects are achieved in accordance with the present invention by providing a task scheduler which allows two types of tasks to be scheduled for execution: (1) tasks whose execution priority is assigned externally (either by the computer operator or by program decisions made independent of the task scheduling process); and (2) tasks whose priority is determined by internal calculations based on parameters set by the computer operator and internal formulas.

Two major benefits of the task scheduler of the invention are (1) the same computer system can simultaneously provide support to tasks which require fixed priorities relative to other tasks (such as real-time tasks) along with interactive tasks whose scheduling is dependent on the type of interaction; and (2) the method for assigning internally calculated priorities is able to select the correct task for execution in such a fashion as to optimize the responsiveness of the computer to a set of interactive computer users whose computational needs vary from moment to moment.

DESCRIPTION OF THE PREFERRED EMBODIMENT

Figure 1:
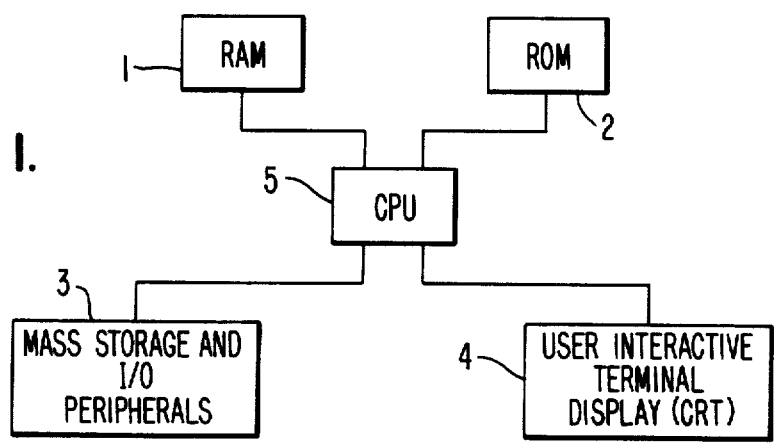
FIG. 1 is a block diagram of a conventional computer system.
Figure 2:
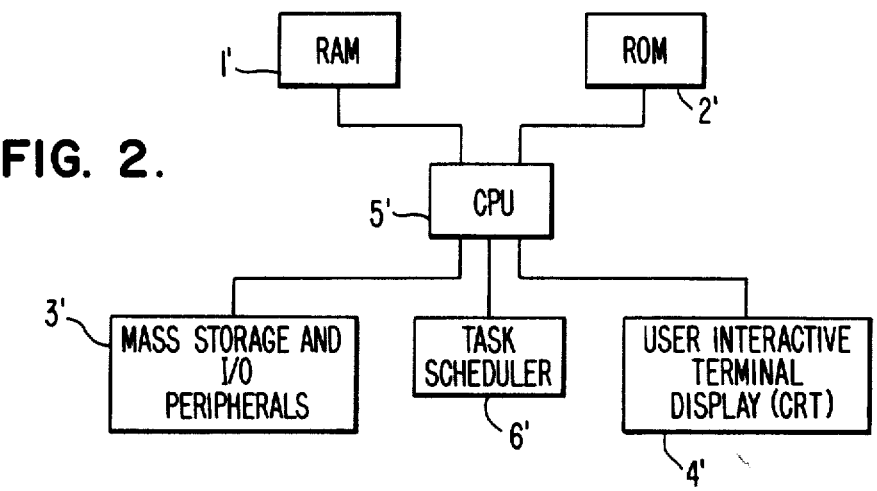
FIG. 2 is a block diagram of a multi-tasking computer system showing the task scheduler of the present invention.

FIG. 2 illustrates a task scheduler 6' in accordance with the present invention shown connected to CPU 5' of a multi-tasking computer system. The computer system also includes RAM 1' and ROM 2' where instructions and temporary data storage areas for a plurality of tasks to be performed by CPU 5' reside. Mass storage and I/O peripherals 3', which allow the computer system to access mass storage devices, such as magnetic disk and tape units, and to communicate with the outside world through such devices as printers, user interactive terminal display 4', which allows the computer system to communicate with the user, are also connected to CPU 5'.

Figure 3:
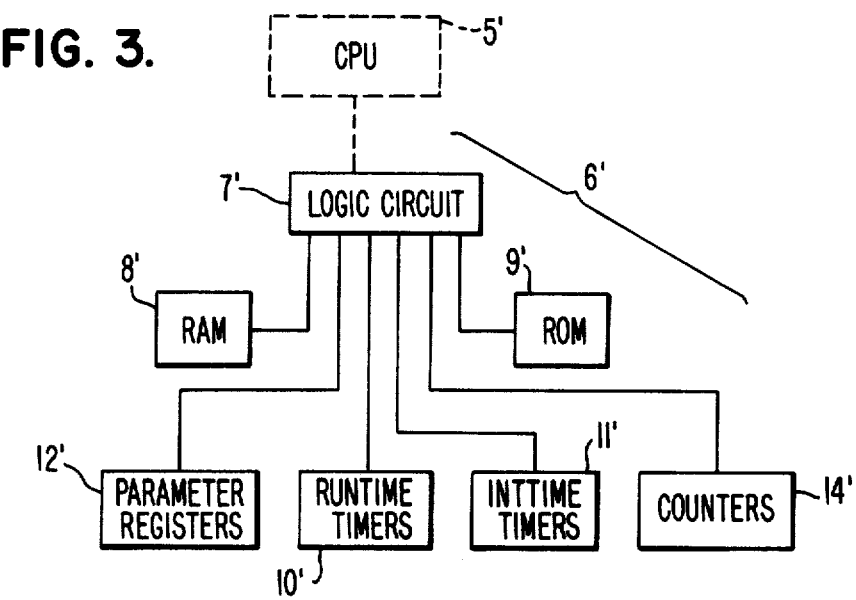
FIG. 3 is a block diagram of the task scheduler of the present invention.

As shown in FIG. 3, the task scheduler of the present invention comprises logic circuit 7', RAM memory 8', ROM memory 9', parameters registers 12', RUNTIME timer 10', INTTIME timer 11' and counters 14'. Logic circuit 7' performs all of the logical computations required to establish the order in which the various tasks stored in RAM 1' and ROM 2' (FIG. 2) as user programs are to be executed by CPU 5' based on task priorities. Logic circuit 7' then instructs CPU 5' as to which tasks should be executed and for how long. The functions performed by logic circuit 7' can be handled by a microprocessor selected from among those known in the art. CPU 5' can also perform these functions but the time spent by the CPU in doing so diminishes the CPU time available for performing tasks for system users. RAM 8' and ROM 9' store the instructions and data required by logic circuit 7' to carry out its functions. Parameter registers 12' store task scheduling parameters used by the task scheduler, RUNTIME timers 10' and INTTIMER timer 11' are elapse timers used by the task scheduler and counters 14' are event counters also used by the task scheduler.

Each task stored in RAM 1' and ROM 2' (FIG. 2) have two priority values associated with them (1) an internal priority provided from within the task scheduler, and (2) an external priority assigned by the computer operator or the task itself. The internal priority may change from moment to moment as external events related to the task occur, time intervals elapse, or as the task performs input/output operations. The external priority is only changed when so designated by the computer operator or the task itself causes a change in external priority. Typically, external priorities change much less frequently than internal priorities; external priorities commonly remain static for the life of the task.

External task priority values are arranged in the following three groups based on three parameters, PRILOW, PRIHI and PRIMAX, which are set by the computer operator:

1. fixed-low-priority;
2. fixed-high-priority; and
3. interactive-priority.

As shown in Table 1 below, the fixed-low-priority group ranges in priority from 0 up to the value specified for the PRILOW parameter. The fixed-high-priority group ranges in priority from the value specified for the PRIHI parameter up to the value specified for the PRIMAX parameter. The interactive-priority group ranges in priority from the values in the range PRILOW + 1 to PRIHI − 1, inclusive.

TABLE 1

| Group | External Task Priorities | | | |
|---|---|---|---|---|
| | O | PRILOW | PRIHI | PRIMAX |
| Fixed Low Priority | ⟵——⟶ | | | |
| Interactive Priority | | ⟵——⟶ | | |
| Fixed High Priority | | | | ⟵——⟶ |

Thus, external task priority values are constrained to be in the range 0 to PRIMAX.

The internal priority for a task is determined by the "state" of the task. There is a one-to-one correspondence between task states in accordance with the present invention and internal priorities. Table 2 shows each of the task state names along with its assigned internal priority.

TABLE 2

Task States and Assigned Internal Priorities

| Task State Name | Internal Priority | Brief Description |
|---|---|---|
| S$RT | 6 | Fixed-high-priority task |
| S$TTFN | 5 | Normal terminal input done |
| S$HICP | 4 | Interactive computation |
| S$IOFN | 3 | Input/Output completed |
| S$CPU | 2 | Compute-bound task |
| S$LOW | 1 | Fixed-low-priority task |
| S$WAIT | 0 | Waiting for something |

The relative magnitude of the priority values is significant but the actual choice of numerical values is not. A task with a greater internal priority value takes precedence over a task with a lesser internal priority value. Any consistent system may be employed to associate internal priority values with states, so long as the relative priority of the states is maintained.

In actual practice of the present invention, it may be convenient to subdivide the S$WAIT state into a series of states relative to the event or resource on which the task is waiting. However, all of these waiting states will have an internal priority of 0 because a task in these states cannot be executed. By definition, tasks having a 0 status are waiting on some event to occur before execution can proceed. Thus, subdividing the S$WAIT state has no effect on the task scheduling procedure.

An entry for each task to be performed by CPU 5' is placed in an ordered list in task scheduler 6'. The order of the entries in the list is based on both the internal and external task priorities. The list is arranged so that a task with a certain internal priority is nearer to the top of the list than any task with a lower internal priority and further from the top of the list than any task with a higher internal priority (i.e., the list is sorted in descending order by internal priorities). If two tasks have the same internal priority, they are arranged so that the one with the higher external priority is nearer to the top of the list. If two tasks have the same internal and external priority, the task which most recently entered that state is placed after (i.e., further from the top of the list) the other tasks with the same state and priority. The entry position for a task in the ordered list changes as the external priority and task state (with associated internal priority) change. Thus, the position within the list indicates the priority of a task, relative to other tasks, at any instant in time.

The task scheduling method of the present invention has two parts: (1) selection of a task for execution by CPU 5'; and (2) assignment of a task state (and associated internal priority) to tasks. The part of the scheduling method which selects a task for execution by the CPU is described by the following steps:

(1) Examine the state of the task at the top of the ordered list of tasks.

(2) If the state of that task is S$WAIT, do not execute any task but instead go back to step 1 and continue examining the state of the task at the top of the list until it becomes other than S$WAIT.

(3) If the state of the task at the top of the list is other than S$WAIT, execute that task until it is no longer the task at the top of the list or its state changes to S$WAIT. When either of these events occur, suspend the execution of the current task and go back to step 1.

This part of the scheduling method is performed by task scheduler 6' each time a task state or external priority changes.

The second part of the task scheduling method performed by the task scheduler assigns states to tasks based on the following events and factors:

(1) external task priorities;

(2) external events such as the completion of an input-/output operation, or an interrupt from a peripheral device;

(3) receipt of characters and messages from those who are using the computer;

(4) actions taken by the task such as waiting for an input/output operation to be complete; and (5) the passage of certain amounts of time since a designated event last occurred.

The specific state transitions based on these events and factors are an important part of the task scheduling method of the present invention. The portion of the task scheduler which determines state transitions is responsive to external events and interrupts. Such external events and interrupts include: (1) a periodic clock signal interrupt; (2) completion of an I/O operation other than the interactive user terminal; (3) completion of a message from the interactive user terminal; (4) an event which occurs when a task initiates an I/O operation to a device other than the interactive user terminal and waits for completion of the I/O operation; and (5) an event which occurs when a task begins waiting for a message from the interactive user terminal.

The computer operator can adjust a set of parameters which affect the task scheduling process. There are seven parameters which specify time intervals. QUAN0, QUAN1, QUAN1A, QUAN1B, QUAN1C, QUAN2 and QUAN3. There are two parameters which specify event counts: INTIOC and HIPRCT. These parameters may be stored in registers 12' shown in FIG. 3.

As pointed out above, tasks which have external priorities greater than or equal to PRIHI are known as fixed-high-priority tasks. Tasks which have external priorities less than or equal to PRILOW are known as fixed-low-priority tasks. Collectively, tasks with external priorities in either of these two groups are known as fixed-priority tasks. Fixed-priority tasks are treated differently from tasks with external priorities in the range PRILOW+1 to PRIHI−1. Tasks in the fixed-high-priority group can only be assigned two states: S$RT and S$WAIT. If a task in this group is ready to be executed by the CPU, it is placed in the S$RT state. If the task is waiting for something (e.g., waiting for an input/output operation to be complete) the task is placed in the S$WAIT state. Tasks in the fixed-low-priority group can only be assigned two states: S$LOW and S$WAIT. If a task in this group is ready to be executed by the CPU, its state is S$LOW. If the task is waiting for some event to occur, its state is S$WAIT.

Since the S$RT state has a higher internal priority value than any other state, tasks in the fixed-high-priority group take precedence over all other tasks. If a fixed-high-priority task is in the S$RT state (because it is ready to be executed), and it has the highest external priority of any task that is ready to be executed, then it is executed until one of the following conditions occurs:

(1) If some other task with a higher external priority becomes ready to execute, the execution of the current task is suspended (but its state continues to be S$RT) and the higher priority task becomes the currently executing task.

(2) If the task stops executing because it is waiting for an event to occur, its state changes from S$RT to S$WAIT and its execution is suspended.

If there are two or more fixed-high-priority tasks which are ready to be executed by the CPU and which have the same external priority, then the first task to have entered the S$RT state is allowed to execute until QUAN0 units of time have elapsed or until the task enters the S$WAIT state. QUAN0 is an arbitrarily chosen amount of time dependent on the operating speed of the computer system and the number of tasks resident in the system. The second task is then allowed to execute for QUAN0 units of time, and so on. Once all of the tasks with the same priority have executed, the cycle is repeated again as long as there are no other tasks with different priorities.

Fixed-high-priority tasks are generally used for real-time tasks where rapid response to external events is critical. By allowing a range of external priorities PRIHI to PRIMAX for fixed-high-priority tasks, it is possible to have multiple real-time tasks with varying response requirements concurrently being serviced by CPU 5'.

All tasks in the fixed-low-priority group that are ready to be executed by CPU 5' have the S$LOW state. The S$LOW state is a lower internal priority than any other executable state (S$WAIT is not an executable state). If a fixed-low-priority task is in the S$LOW state (because it is ready to be executed), and it has the highest external priority of any task that is ready to be executed, then it is executed until one of the following conditions occurs:

(1) If some other task with a higher internal or external priority becomes ready to execute, the execution of the current task is suspended (but its state continues to be S$LOW) and the higher priority task becomes the currently executing task.

(2) If the task stops executing because it is waiting for some event to occur, its state changes from S$LOW to S$WAIT and its execution is suspended.

If there are two or more fixed-low-priority tasks which are ready for execution by the CPU and which have the same external priority, then the first task to have entered the S$LOW state is allowed to execute until QUAN3 units of time have elapsed or until the task enters the S$WAIT state. QUAN3 is also an arbitrarily chosen amount of time dependent on the operating speed of the computer system and the number of tasks resident in the system. The second task is then allowed to execute for QUAN3 units of time, and so on. Once all of the tasks will the same priority have executed, the cycle is repeated again as long as there are no other tasks with higher priorities. Fixed-low-priority tasks are generally used for background tasks where rapid response is not important.

Tasks with external priorities in the range PRILOW+1 to PRIHI−1 are called interactive-priority tasks and are scheduled for execution by CPU 5' in a more complex fashion than fixed-priority tasks. For these tasks, the task state (and assigned internal priority) is the principal scheduling factor. External priority only affects the execution of tasks that have the same internal priority. Interactive-priority tasks can never enter the S$RT and S$LOW states. These states are reserved for fixed-high-priority and fixed-low-priority tasks. The states which can be entered by interactive-priority tasks can be grouped into three categories as shown by Table 3 below.

TABLE 3

| Type Priority | State |
| --- | --- |
| Interactive | S$TTFN |
|  | S$HICP |
| Non-interactive | S$IOFN |
|  | S$CPU |
| Wait | S$WAIT |

Each task has associated with it within task scheduler 6' two timers, RUNTIME 10' and INTTIME 11'. These timers can be reset to zero by the task scheduler. Both timers count elapsed time whenever the task is being executed by CPU 5' and are suspended (not counting time and not reset) whenever CPU 5' is not executing the task. The RUNTIME timer is reset to zero each time the state of the task is changed. The value in a timer can be compared to time parameters such as QUAN1, QUAN1A, QUAN1B, etc., which are expressed in the same time units. These parameters are also arbitrarily chosen depending on the operating speed of the computer system and the number of tasks resident in the system. Elapsed time can be kept independently for each task since each task has a separate pair of timers within task scheduler 6'. In addition to the timers, each task has an associated counter called IOCOUNT (i.e., counters 14' in FIG. 3). This counter can also be reset to zero by task scheduler 6'. The counter is incremented by one each time the task performs an I/O operation.

Figure 4:
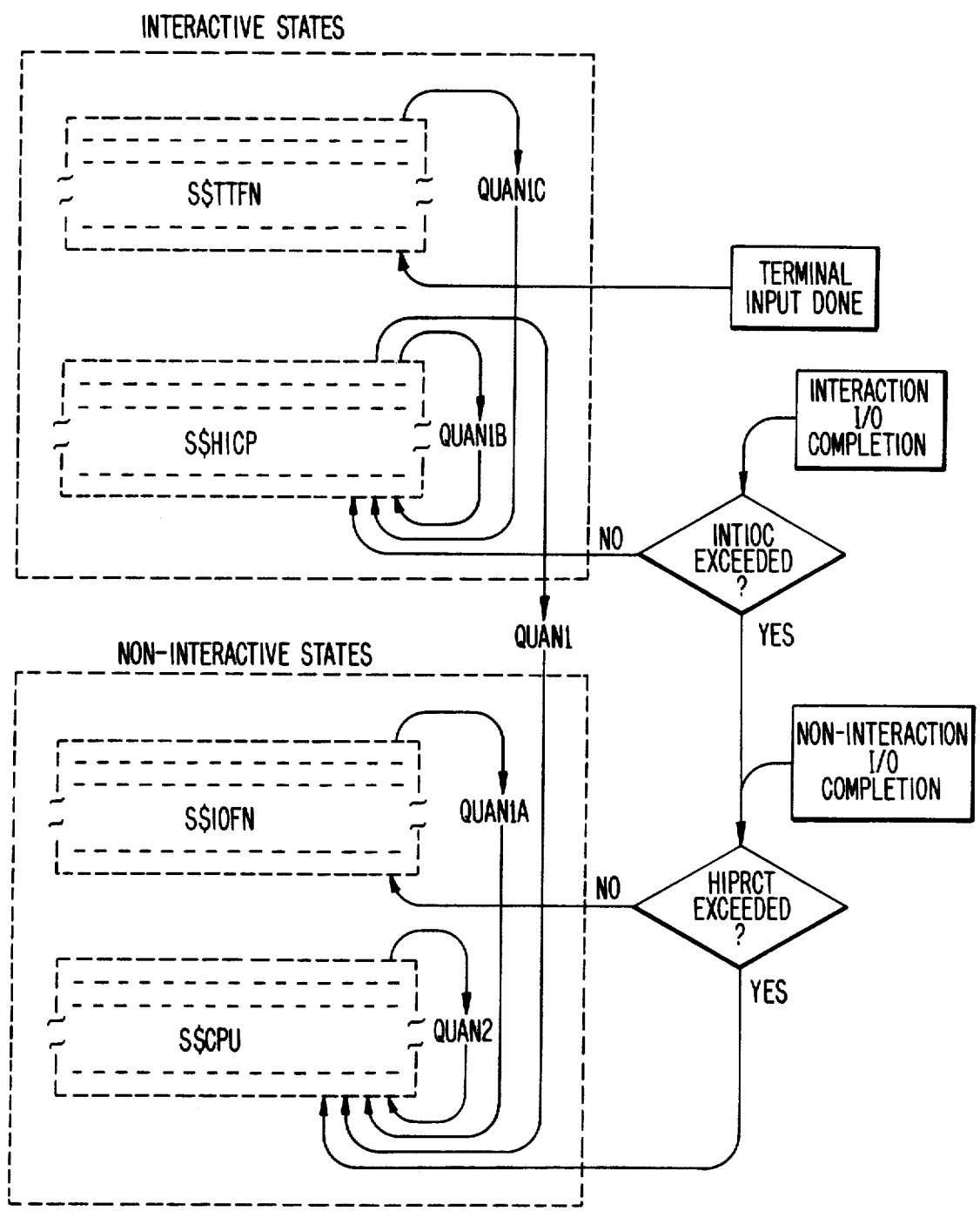
FIG. 4 is an illustration of the state transitions of an inactive task in accordance with the present invention.

The portion of task scheduler 6' which controls the state transitions for interactive priority tasks will now be described as illustrated in FIG. 4. The initial state for the task will be assumed to be S$WAIT with the task performing no I/O operations and waiting for receipt of a message from a communications terminal being used by a computer operator. In the discussion which follows, an I/O operation performed to the computer user's interactive communication terminal is so noted while I/O operations to other devices (e.g., disk or tape units) are simply called I/O operations. When a message is received from the computer user, that user's task timers, RUNTIME and INTTIME, and counter, IOCOUNT, are reset to zero. The state of the user's task is changed from S$WAIT to S$TTFN.

The following events can cause a task to leave the S$TTFN state.

(1) If the task performs an I/O operation, the state changes to S$WAIT while waiting for the I/O operation to finish. When the I/O operation finishes, the state is changed to S$HICP, S$IOFN, or S$CPU depending on the value of the IOCOUNT counter. If the IOCOUNT value is less than or equal to INTIOC, the state is changed to S$HICP. If the value of IOCOUNT exceeds INTIOC, the state is changed to either S$IOFN or S$CPU depending on whether the value of IOCOUNT exceeds HIPRCT. If IOCOUNT is less than or equal to HIPRCT, the state is changed to S$IOFN, otherwise it is changed to S$CPU. If the state is changed to S$CPU, IOCOUNT is reset to zero.

(2) If the value of the RUNTIME timer exceeds QUAN1C, the state is changed to S$HICP.

(3) If the value of the INTTIME timer exceeds QUAN1, the state is changed to S$CPU.

The following events affect a task which is in the S$HICP state.

(1) If the task performs an I/O operation, the state changes to S$WAIT while waiting for the I/O operation to finish. When the I/O operation finishes, the state is changed to S$HICP, S$IOFN, or S$CPU depending on the value of IOCOUNT. If IOCOUNT is less than or equal to the INTIOC parameter, the state is changed to S$HICP. If IOCOUNT is greater than INTIOC and if IOCOUNT is less than or equal to HIPRCT, the state is changed to S$IOFN, otherwise it is changed to S$CPU. If the state is changed to S$CPU, IOCOUNT is reset to zero.

(2) If the value of the RUNTIME timer exceeds QUAN1B, the state is changed to S$HICP. This has the effect of placing the task behind any other tasks which are also in the S$HICP state.

(3) If the value of the INTTIME timer exceeds QUAN1, the state is changed to S$CPU.

The following events affect a task which is in the S$IOFN state.

(1) If the task performs an I/O operation, the state changes to S$WAIT while waiting for the I/O operation to finish. When the I/O operation finishes, the state changes to either S$IOFN, or S$CPU depending on whether the value of IOCOUNT exceeds HIPRCT. If IOCOUNT is less than or equal to HIPRCT, the state changes to S$IOFN, otherwise it changes to S$CPU. If the state changes to S$CPU, IOCOUNT is reset to zero.

(2) If the value of the RUNTIME timer exceeds QUAN1A, the state is changed to S$CPU.

The following events affect a task which is in the S$CPU state.

(1) If the task performs an I/O operation, the state changes to S$WAIT while waiting for the I/O operation to finish. When the I/O operation finishes, the state changes to either S$IOFN or S$CPU depending on whether the value of IOCOUNT exceeds HIPRCT. If IOCOUNT is less than or equal to HIPRCT, the state changes to S$IOFN, otherwise it changes to S$CPU. If the state changes to S$CPU, IOCOUNT is reset to zero.

(2) If the value of the RUNTIME timer exceeds QUAN2, the state is changed to S$CPU. This has the effect of placing the task behind any other tasks which are also in the S$CPU state.

The state transition cycle is completed when the task enters the S$WAIT state while waiting for another message from the user's communications terminal.

While the present invention has been described in detail with reference to the drawings and various tables, a person skilled in the art will appreciate that changes and modifications may be made therein without departing from the spirit and the scope of this invention as defined in the appended claims.

I claim:

1. In a computer system comprising a memory for storing a plurality of computer programs for processing user queries to said computer system and a CPU for executing said stored programs, a method for selecting the order in which said programs are executed by said CPU, said method comprising the steps of:
   examining each of said user queries to determine which of said queries can be processed in a short period of time and which of said queries require a longer period of time to process; and
   giving precedence to said user queries which can be processed in a short period of time.

2. The method of claim 1 wherein the step of examining each of said user queries includes the step of selecting a first time parameter which distinguishes between user queries which require a short period of time to process and user queries which require a longer period of time to process.

3. The method of claim 1 wherein said step of giving precedent to said user queries which can be processed in a short period of time includes the step of interrupting a longer user query currently being processed by said CPU to process a shorter user query.

4. The method of claim 1 wherein the step of giving precedent to said user query which can be processed in a short period of time includes the steps of:
   assigning to each of said user queries a predetermined external priority of processing:
   assigning to each of said user queries an internal priority of processing dependent on said predetermined external priority and the status of each query; and
   selecting for processing by said CPU the query with the highest said internal priority.

* * * * *